United States Patent
Falk

(10) Patent No.: US 10,841,309 B2
(45) Date of Patent: Nov. 17, 2020

(54) CONTROLLING ACCESSES TO NETWORKS BASED ON IT SYSTEMS HAVING EMBEDDED SYSTEMS OR DISTRIBUTED SYSTEMS

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 231 days.

(21) Appl. No.: 15/933,431

(22) Filed: Mar. 23, 2018

(65) Prior Publication Data

US 2018/0288053 A1   Oct. 4, 2018

(30) Foreign Application Priority Data

Mar. 31, 2017 (EP) .................................... 17164078

(51) Int. Cl.
*H04L 29/06* (2006.01)
*G05B 19/042* (2006.01)

(52) U.S. Cl.
CPC .......... *H04L 63/10* (2013.01); *G05B 19/0428* (2013.01); *H04L 63/0209* (2013.01);
(Continued)

(58) Field of Classification Search
CPC ... H04L 63/10; H04L 63/0209; H04L 63/101; H04L 63/1408; H04L 63/20; G06B 19/0428; G05B 2219/31246
(Continued)

(56) References Cited

U.S. PATENT DOCUMENTS 8,341,724 B1 * 12/2012 Burns ................. H04L 63/0428
726/13
2005/0018618 A1 * 1/2005 Mualem .............. H04L 63/1458
370/252
(Continued)

FOREIGN PATENT DOCUMENTS

CN   1489341 A   4/2004
CN   101656634 A   2/2010
(Continued)

OTHER PUBLICATIONS

Search Report of EP 17164078 by European Patent Office (dated Nov. 9, 2017) (Year: 2017).*
(Continued)

*Primary Examiner* — Michael S McNally
(74) *Attorney, Agent, or Firm* — Schmeiser, Olsen & Watts LLP

(57) ABSTRACT

To improve the access control in regard to safety and protection of network operation and network data when controlling accesses to networks based on IT systems including embedded systems or distributed systems, it is proposed that observation and evaluation (detection) of the communication in a network (performance of a network communication protocol collation of the observed protocol with a multiplicity of reference protocols, preferably stored in a list, that are usually used in operation- and/or safety-critical networks) be used to independently identify whether an uncritical or critical network is involved in the course of a network access, in particular the setup of a network connectivity, to at least one from at least one network that is uncritical in regard to operation and/or safety, in particular referred to as a standard network, and at least one network that is critical in regard to operation and/or safety.

26 Claims, 2 Drawing Sheets

Figure 1:
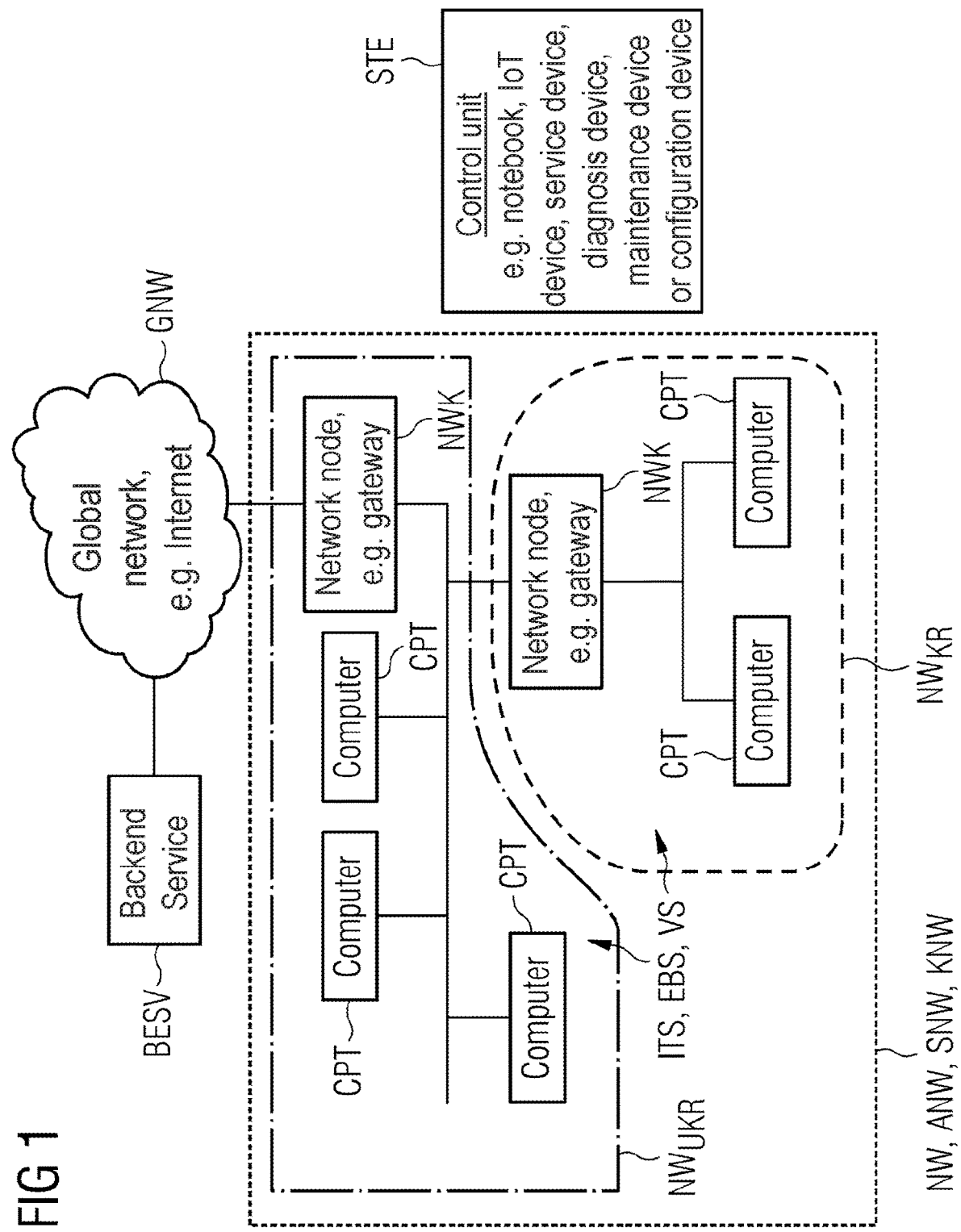

(52) U.S. Cl.
CPC ........ *H04L 63/101* (2013.01); *H04L 63/1408* (2013.01); *H04L 63/20* (2013.01); *G05B 2219/31246* (2013.01)

(58) Field of Classification Search
USPC .......................................................... 726/4
See application file for complete search history.

(56) References Cited

U.S. PATENT DOCUMENTS

| | | | |
|---|---|---|---|
| 2005/0216956 A1* | 9/2005 | Orr | H04L 63/0209 726/23 |
| 2008/0092222 A1* | 4/2008 | Liu | H04L 63/02 726/11 |

FOREIGN PATENT DOCUMENTS

| | | |
|---|---|---|
| CN | 102958202 A | 3/2013 |
| CN | 103841101 A | 6/2014 |
| CN | 104410642 | 3/2015 |

OTHER PUBLICATIONS

Written Opinion of EP 17164078 by European Patent Office (dated Nov. 9, 2017) (Year: 2017).*

Premaratne Upeka Kanchana et al: "An Intrusion Detection System for IEC61850 Automated Substations", IEEE Transactions on Power Delivery, IEEE Service Center, New York, NY, US, vol. 25, No. 4, pp. 2376-2383, XP011317983, ISSN: 0885-8977; 2010.

Yang Y et al: "Multiattribute SCADA-Specific Intrusion Detection System for Power Networks", IEEE Transactions on Power Delivery, IEEE Service Center, New York, NY, US, vol. 29, No. 3, pp. 1092-1102, XP011548844, ISSN: 0885-8977, DOI: 10.1109/TPWRD. 2014.2300099, gefunden am May 21, 2014; 2014.

Fovino Igor Nai et al: "Modbus/DNP3 State-Based Intrusion Detection System"; Advanced Information Networking and Applications (AINA), 2010 24th IEEE International Conference on, IEEE, Piscataway, NJ, USA; pp. 729-736; XP031682596, ISBN: 978-1-4244-6695-5; 2010.

Verba Jared et al: "Idaho National Laboratory Supervisory Control and Data Acquisition Intrusion Detection System (SCADA IDS)", Technologies for Homeland Security, 2008 IEEE Conference on, IEEE, Piscataway, NJ, USA, pp. 469-473, XP031266642, ISBN: 978-1-4244-1977-7; 2008.

Igure Vinay M et al: "Security issues in SCADA networks", Computers & Security, Elsevier Science Publishers. Amsterdam, NL, vol. 25, No. 7, pp. 498-506, XP027896387, ISSN: 0167-4048, gefunden am Oct. 1, 2006; 2006.

Non-English Chinese Office Action dated Aug. 4, 2020 for Application No. 201810294184.5.

* cited by examiner

CONTROLLING ACCESSES TO NETWORKS BASED ON IT SYSTEMS HAVING EMBEDDED SYSTEMS OR DISTRIBUTED SYSTEMS

CROSS-REFERENCE TO RELATED APPLICATION

This application claims priority to European Application No. 17164078.2, having a filing date of Mar. 31, 2017, the entire contents of which are hereby incorporated by reference.

FIELD OF TECHNOLOGY

The following relates to a method for controlling accesses to networks based on IT systems, in particular, automation networks control networks or supervisory networks comprising embedded systems or distributed systems, a computer program product (non-transitory computer readable storage medium having instructions, which when executed by a processor, perform actions) for controlling accesses to networks based on IT systems, in particular, automation networks, control networks or supervisory networks comprising embedded systems or distributed systems, and a control unit for controlling accesses to networks based on IT systems, in particular, automation networks, control networks or supervisory networks comprising embedded systems or distributed systems.

BACKGROUND

An IT system is an electronic data processing system that, because it is VNA based (based on a von Neumann architecture), includes e.g. any type of distributed systems and embedded systems, but also individual computers, large computers, high-performance computers, etc., in some cases even communication systems and the Internet in its entirety. IT systems may also be based on other architectures than a VNA architecture, however, e.g. on a Harvard architecture.

In the industrial sphere, networks based on such IT systems, for example in the shape of automation networks, control networks or supervisory networks comprising embedded systems or distributed systems, are employed that use "Internet of Things <IoT>" technologies, e.g. in order to transmit diagnosis data in the course of a network access to a backend system.

In this regard, it is known practice to use e.g. a diagnosis box configured as an "Internet of Things <IoT>" device that accomplishes this by
(i) setting up a connectivity to the respective network,
(ii) in so doing captoring different network sensors that may be integrated in the networks or else linked to the networks either by wire or wirelessly, and
(iii) having different network interfaces, e.g. an Ethernet interface, a mobile radio interface based on the 3G/4G/5G standard, a WLAN interface, etc.

The diagnosis box should moreover, for this purpose, be connected only to separate network sensors, provided exclusively for the diagnosis, of a network that is uncritical in regard to operation and/or safety, in particular referred to as a standard network, and not to a network-specific control system that is part of a network critical in regard to operation and/or safety. Ensuring this requires additional outlay, however, because existing sensor data and operating data that are present in the control system are not evaluable.

There is therefore the risk of the user of the diagnosis box or of the IoT device inadmissibly connecting said diagnosis box or IoT device to the critical control system of the network that is critical in regard to operation and/or safety. From the point of view of the network, there is therefore the need for influencing of the control system by virtue of the diagnosis box or the IoT device accessing the network that is critical in regard to operation and/or safety, or setup of the connectivity to the critical network, to be prevented.

There is thus a Siemens product in the form of a "data capturing unit <DCU>" box that can concurrently read data on an Ethernet network without any reaction. To this end, a network interface is provided that is physically realized such that sending of Ethernet frames is not possible. This solution requires specific hardware, however.

Furthermore, in Microsoft Windows™, it is known practice to set up multiple network configurations. For each network, a user can indicate during setup whether it is a private or public network. On the basis of this, the network security settings are adjusted automatically on the basis of the connected network.

SUMMARY

An aspect relates to a method, a computer program product and a control unit for controlling accesses to networks based on IT systems, in particular automation networks, control networks or supervisory networks comprising embedded systems or distributed systems, for which or with which the access control is improved in regard to safety and protection of network operation and network data.

When reference is made to a network access in connection with embodiments of the invention registered in the present case, the use of the term "access" is intended to incorporate all corresponding network actions from setting up a network connectivity to accessing network data.

The concept on which embodiments of the invention is based according to the technical teaching specified in each of claims 1, 10 and 17 is that observation and evaluation (detection) of the communication in a network (performance of a network communication protocol collation of the observed protocol with a multiplicity of reference protocols, preferably stored in a list, that are usually used in operation- and/or safety-critical networks) be used to independently identify whether an uncritical or critical network is involved in the course of a network access, in particular the setup of a network connectivity, to at least one from at least one network that is uncritical in regard to operation and/or safety, in particular referred to as a standard network, and at least one network that is critical in regard to operation and/or safety.

Depending on the detection result, a warning, preferably a "critical network signal <CNS>", is provided.

In this case, it is in particular indicated that a network that is critical in regard to operation and/or safety is accessed, or the network connectivity to a network that is critical in regard to operation and/or safety is set up.

The embodiment prevents, e.g. if an inadvertent or intentional inadmissible attempt is made, e.g. in the course of diagnosis, service, startup, maintenance, configuration, etc., to access the operation- and/or safety-critical network, the operation- and/or safety-critical network from being adversely affected by this access.

This applies in particular if e.g. an inexperienced user inadvertently or intentionally, e.g. using a service notebook, a diagnosis device, startup device, maintenance device or configuration device, an "Internet of Things <IoT>" device or a device for capturing predictive maintenance data, accesses an operation- and/or safety-critical automation installation or sets up a connection to the operation- and/or safety-critical automation installation.

The concept on which embodiments of the invention is based relates in particular to a control unit according to claim 17 that, according to claim 26, is advantageously configured as a service notebook, a diagnosis device, startup device, maintenance device or configuration device, an "Internet of Things <IoT>" device or a device for capturing predictive maintenance data and independently identifies whether it is connected to an operation-critical and/or safety-critical network at a network interface. To this end, the network communication on this network interface is observed. In this case, in particular the communication of other devices of the network connected via the network interface or the communication between other devices of the network connected via the network interface is observed. The observed and subsequently evaluated network communication (e.g. safety protocol or real time control protocol used) is used to identify whether said, e.g. by virtue of network access or setup of the network connectivity, network is an operation-critical and/or safety-critical network.

The control unit can have multiple network interfaces. In this case, embodiments of the invention may be realized on all or individual network interfaces. The control unit according to embodiments of the invention prevents an operation-critical and/or safety-critical network from being perturbed in the event of erroneous wiring. The control unit can have specific network ports at which connection to the operation-critical and/or safety-critical network is admissible.

In the case of the control unit too, the detection result is taken as a basis for generating a warning, preferably a "critical network signal <CNS>", and outputting it via an output interface.

This indicates that there is an operation-critical and/or safety-critical network present on the network interface.

Both the provided and the generated and output "critical network signal <CNS>" can be used in different ways:
- as a color coding—e.g. "GREEN" color for an uncritical network or standard network, "RED" color for an operation- and/or safety-critical network (cf. claims 3, 12 and 19) and preferably, in the case of the control unit according to claim 19, for display on the network interface;
- Display in administration menu/as status indicator (cf. claims 4 and 20);
- Automatic blocking and/or disabling of the network access (cf. claims 6, 13 and 22) and preferably, in the case of the control unit according to claim 22, of the network interface. This prevents the network access or the control unit from presenting a risk to the operation- and/or safety-critical network;
- Restricting of the admissible network communication protocols for the network access (cf. claims 7, 14 and 23) and preferably, in the case of the control unit according to claim 23, on the network interface by the control unit (network communication in the operation- and/or safety-critical network is prevented from being influenced, or the control unit prevents this. To this end, e.g. Firewall rules can be adapted or it is possible for a read-only access to be configured or it is possible for a read-only mode for the network interface to be configured);
- Other network interfaces of the control unit can be disabled or limited (e.g. blocking of an Internet/mobile radio connection); and
- Display of an error message (cf. claims 5 and 21).

The aforementioned actions are preferably taken automatically.

Moreover, preferably an administrator (cf. claim 5), or an administrator of the control unit, can explicitly enable the configuration identified as problematic. This is done e.g. by virtue of the blocking or disabling being canceled again by control commands input by a network administrator and the network access to the operation- and/or safety-critical network and preferably, in the case of the control unit according to claim 24, the network interface to the operation- and/or safety-critical network being enabled again.

BRIEF DESCRIPTION

Figure 2:
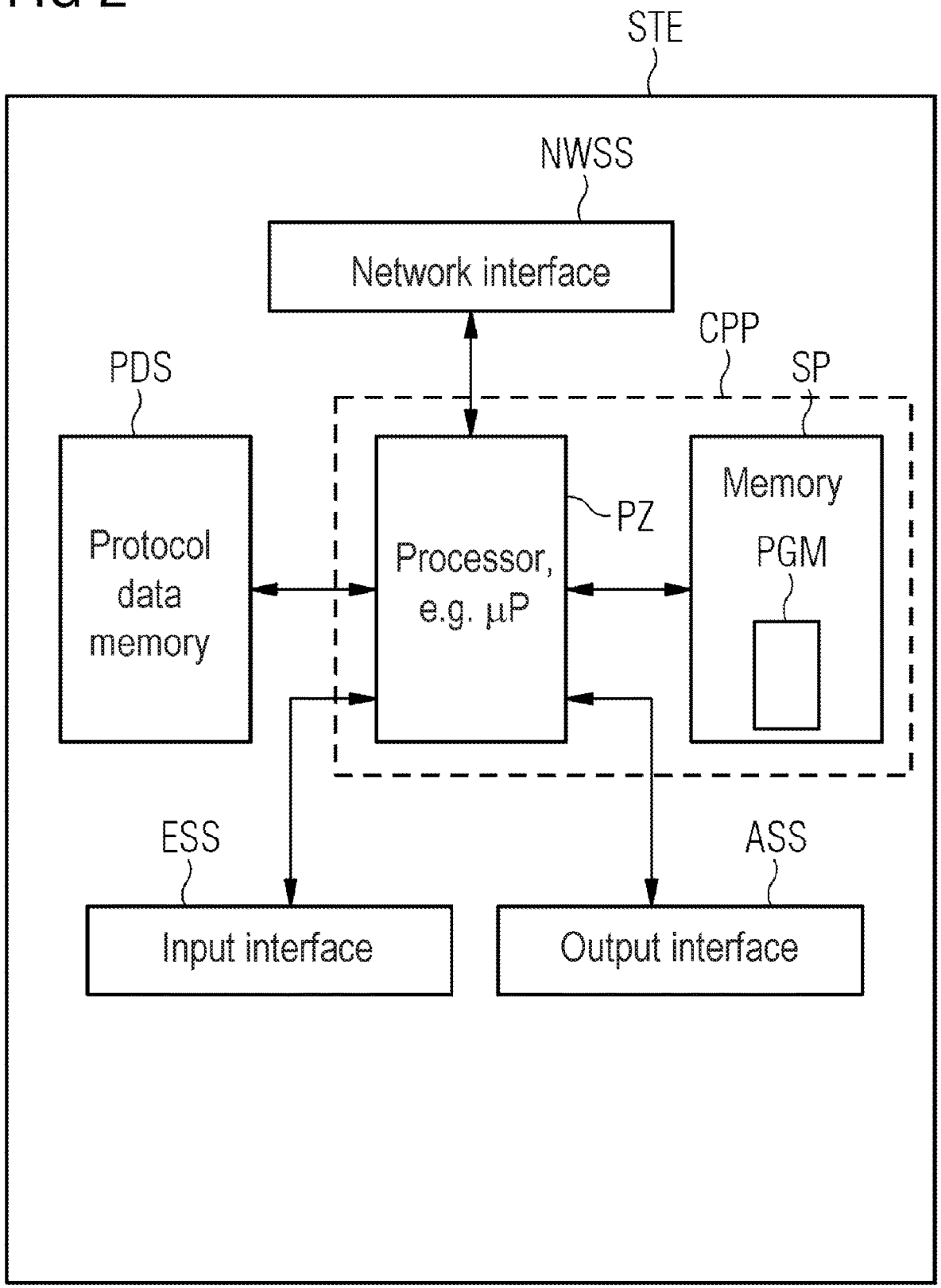

Some of the embodiments will be described in detail, with reference to the following figures, wherein like designations denote like members, wherein:

FIG. 1 shows a typical network scenario in the industrial IT sphere in which networks based on IT systems, in particular automation networks, control networks or supervisory networks comprising embedded systems or distributed systems, are accessed arbitrarily, in accordance with embodiments of the present invention and FIG. 2 shows the basic design of a control unit controlling the accesses shown in FIG. 1.

DETAILED DESCRIPTION

FIG. 1 shows a typical network scenario in the industrial IT sphere in which networks NW, $NW_{UKR}$, $NW_{KR}$ based on IT systems ITS are accessed as per the definition of the term specified in the general part of the description for a network access. According to this network scenario, a network NW that is preferably configured as an automation network AWN, control network SNW or supervisory network KNW includes a network $NW_{UKR}$ that is uncritical in regard to operation and/or safety, referred to as a standard network, and a network $NW_{KR}$ that is critical in regard to operation and/or safety. The two subnetworks $NW_{UKR}$, $NW_{KR}$ are preferably based on an embedded system EBS or distributed system VS. The number of critical and uncritical networks $NW_{UKR}$, $NW_{KR}$ in the network NW is not limited to the two subnetworks depicted, but rather may be generally large enough for at least one uncritical network $NW_{UKR}$ and at least one critical network $NW_{KR}$ to be included in the network NW.

Both the uncritical network $NW_{UKR}$ and the critical network $NW_{KR}$ in the network NW are configured as a "multicomputer system" in which a respective computer CPT, which is preferably configured as a field device, a controller, IoT device, planning tool or service tool, in order to control tasks and functions arising in the automation network AWN, the control network SNW or the supervisory network KNW of the network NW. In the course of this task and function control, the computer CPT communicates with a backend service BESV at regular intervals across networks via a network node NWK, which may be configured as a gateway, for example, and a superordinate global network GNW, preferably acting as the Internet, e.g. in order to transmit status data for "predictive maintenance".

An inherent aspect of the network scenario depicted in FIG. 1 is an automation scenario in which the critical network $NW_{KR}$ is accompanied by a realtime-critical production cell (realtime cell), what is known as a safety cell, having multiple computers CPT configured e.g. as field devices, whereas the uncritical network $NWU_{UKR}$ is accompanied by a realtime-uncritical production cell (non-realtime cell) again having multiple computers CPT configured e.g. as field devices.

The further part of the network scenario depicted is a control unit STE that can be used to access both the network $NW_{UKR}$ that is uncritical in regard to operation and/or safety and the network $NW_{KR}$ that is critical in regard to operation and/or safety. To this end, the control unit STE sets up a connectivity to the respective network by connecting to the respective network using a wired or wireless connection technology, such as e.g. Ethernet or WLAN, Bluetooth or mobile radio based on the 3G/4G/5G standard. For this purpose, the control unit STE is preferably configured as a notebook, as an "Internet of Things <IoT>" device, as a diagnosis device, maintenance device or configuration device, as a device for capturing predictive maintenance data. Based on the automation scenario, the control unit STE can be connected both to the realtime cell and to the non-realtime cell.

There is therefore the danger that the control unit STE inadmissibly connects to the critical control system of the network that is critical in regard to operation and/or safety. From the point of view of an operator/administrator of the network NW depicted in FIG. 1, there is therefore the need for influencing of the network NW by the access of the control unit STE to the network $NW_{KR}$ that is critical in regard to operation and/or safety, or realtime cell, to be prevented if e.g. an attempt is made to set up a connectivity to the critical network $NW_{KR}$, or to the realtime cell.

In other words, from the point of view of the network, it is useful and expedient to implement an access control that avoids a dangerous scenario of this kind. How this happens is explained by means of the description for FIG. 2.

FIG. 2 shows the basic design of the control unit STE that can be used to perform such an access control. As such, the control unit STE has a nonvolatile, readable memory SP that stores processor-readable control program commands of a program module PGM controlling the access control, a processor PZ that is connected to the memory SP, is preferably configured as a microprocessor "µP" and executes the control program commands of the program module PGM, a protocol data memory PDS that is connected to the processor PZ and stores a multiplicity of reference protocols, preferably in a list, that are usually used in the operation- and/or safety-critical networks $NW_{KR}$, a network interface NWSS that is connected to the processor PZ and used to effect network access to the uncritical network $NW_{UKR}$ and the critical network $NW_{KR}$, or setup of the network connectivity, and also an input interface ESS and an output interface ASS for user-specific processes in connection with the access control.

A central element in the control unit STE for the access control that is to be performed is the program module PGM, which is purchasable as an APP separately or independently of the control unit STE and is uploadable into the control unit STE and hence forms a computer program product CPP together with the processor and memory that are usually already present in the control unit.

The components of the control unit STE that are listed above form a functional unit and are configured such that each network access, as such e.g. each time a network connectivity is set up or an attempt is made to set up a network connectivity, prompts at least one network communication protocol used in the respective network $NW_{UKR}$, $NW_{KR}$ of the network communication to be ascertained. These are network communication protocols used by other nodes (e.g. other computers) in the respective network $NW_{UKR}$, $NW_{KR}$ or network communication protocols used between other nodes (e.g. other computers) of the respective network $NW_{UKR}$, $NW_{KR}$, for example.

Thereafter, the functional unit formed collates the respectively ascertained network communication protocol with the multiplicity of reference protocols that are usually used in the operation- and/or safety-critical networks $NW_{KR}$ and are stored in the protocol data memory PDS, e.g. in a list.

If the collation of the ascertained network communication protocol with the reference protocols in this case reveals that at least one ascertained network communication protocol is concordant with a dedicated reference protocol of the reference protocols, the respective network access, in particular the respective setup of the network connectivity, then prompts a warning, which may be e.g. a "critical network signal <CNS>", to be generated and output via the output interface ASS. The generation and output via the output interface ASS can also be regarded in a general form as provision.

If, contrary to the depiction in FIG. 1, multiple uncritical networks $NW_{UKR}$ and critical networks $NW_{KR}$ are included in the network NW, the critical networks $NW_{KR}$ moreover differ and the control unit STE accesses, e.g. using an appropriate number of separate network interfaces NWSS, the networks $NW_{UKR}$, $NW_{KR}$ and in particular the critical networks $NW_{KR}$, e.g. by respectively setting up the network connectivity, then it is preferably also possible for multiple, according to the number of different critical networks $NW_{KR}$, warnings, or CNS signals for the respective identification thereof, to be generated and output, or provided.

The warning or the warnings is/are generated and output, or provided, preferably if an inadvertent or intentional but inadmissible attempt is made, e.g. in the course of diagnosis, service, startup, maintenance, configuration, etc., to access the operation- and/or safety-critical network, or the networks, $NW_{KR}$.

If, furthermore, multiple network protocols are determined or ascertained for the critical network $NW_{KR}$ and only one of these ascertained protocols is concordant with the stored reference protocols, then the warning is generated and output, or provided. Only if no ascertained network protocol is concordant with the stored reference protocols—in this case, the critical network $NW_{KR}$ is by definition no longer a critical network, but rather an uncritical network—is the warning not generated and output, or provided. As such, different warnings are preferably generated and output, or provided, for the network accesses, or for the setup of the network connectivities, to different networks $NW_{KR}$ that are critical in regard to operation and/or safety.

If the network access or the setup of the network connectivity involves an uncritical network, then the access to network data, in particular for network diagnosis, network service, network maintenance, network configuration, etc., is effected without the generation and output, or provision, of the warning.

The warning is preferably configured as an audible warning signal, e.g. in the shape and form of a signal tone.

Moreover, the warning can prompt the network-related access to be color coded, preferably with the color "GREEN" for the network access to the uncritical network or standard network $NW_{UKR}$ and with the color "RED" for the network access to the operation- and/or safety-critical network $NW_{KR}$. In this case, it is particularly advantageous if the color coding is displayed on the network interface NWSS.

Alternatively or additionally, the warning can prompt the network-related access to be displayed in an administration menu or can prompt a network access status to be displayed.

Furthermore, the warning can prompt an error message to be displayed.

In the control unit STE, the processor PZ, the program module PGM and the network interface NWSS are configured such that the provision of the warning prompts the network access to the operation- and/or safety-critical network $NW_{KR}$, and/or the network interface NWSS, to be blocked and/or disabled automatically.

In an alternative manifestation, the processor PZ, the program module PGM and the network interface NWSS in the control unit STE may be configured such that the provision of the warning prompts the admissibility of the network communication protocols used for the network accesses, and/or on the network interface NWSS by the control unit STE, to be restricted. This is done preferably by Firewall rules or by limitation to a read-only access. When a read-only mode is activated, influencing of the operation- and/or safety-critical network $NW_{KR}$ can be reliably prevented, i.e. freedom from reaction is certain.

In a further configuration of the control unit STE, the input interface ESS is connected to the processor PZ and by virtue of this connection, forms, together with the program module PGM executed by the processor PZ and the network interface NWSS, a functional unit that is configured such that the blocking or disabling is canceled again by control commands or enabling codes input by a network administrator and the network access to the operation- and/or safety-critical network $NW_{KR}$, and/or the network interface NWSS to the operation- and/or safety-critical network $NW_{KR}$, is enabled again. This allows a flexible access control designed for different needs to be realized.

In regard to the automation scenario mentioned during the description for FIG. 1, the above embodiments mean that a service notebook configured as a control unit detects which communication protocols are used on the connected network. If a critical protocol, e.g. a safety protocol or a realtime automation protocol, is identified, then the service notebook disables a network interface used for the automation scenario. As a result, the service notebook prevents the operation-critical network from being adversely affected by the service notebook if it is inadvertently connected to the network of the realtime cell.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A method for controlling accesses to networks, based on IT systems comprising embedded systems or distributed systems, the method comprising:
   accessing at least one from at least one network that is uncritical in regard to operation and/or safety, and at least one network that is critical in regard to operation and/or safety, wherein:
   a) the respective network access prompts at least one network communication protocol used in the respective network for network communication to be ascertained,
   b) the respective ascertained network communication protocol is collated with a multiplicity of reference protocols that are usually used in the operation- and/or safety-critical,
   c) if the collation of the ascertained network communication protocol with the reference protocols reveals that at least one ascertained network communication protocol is concordant with a dedicated reference protocol of the reference protocols, the respective network access, then prompts at least one warning to be provided, if an inadvertent or intentional but inadmissible attempt is made to access the operation and/or safety-critical network, otherwise the access to network data is effected without the provision of the warning.

2. The method as claimed in claim 1, wherein an audible warning signal is used as a warning.

3. The method as claimed in claim 1, wherein the warning prompts the network-related access to be color coded, further wherein a "GREEN" color is for the network access to the uncritical network or standard network and a "RED" color is for the network access to the operation- and/or safety-critical network.

4. The method as claimed in claim 1, wherein the warning prompts the network-related access to be displayed in an administration menu or prompts a network access status to be displayed.

5. The method as claimed in claim 1, wherein the warning prompts an error message to be displayed.

6. The method as claimed in claim 1, wherein the provision of the warning prompts the network access to the operation- and/or safety-critical network to be blocked and/or disabled automatically.

7. The method as claimed in claim 1, wherein the provision of the warning prompts the admissibility of the network communication protocols used for the network accesses to be restricted.

8. The method as claimed in claim 6, wherein the blocking or disabling is canceled again by a network administrator and the network access to the operation- and/or safety-critical network is enabled again.

9. The method as claimed in claim 1, wherein different warnings are provided for the network accesses for a setup of the network connectivities to different networks that are critical in regard to operation and/or safety.

10. A computer program product, comprising a computer readable hardware storage device having computer readable program code stored therein, said program code executable by a processor of a computer system to implement a method for controlling accesses to networks based on IT systems comprising embedded systems or distributed systems, wherein at least one from at least one network that is uncritical in regard to operation and/or safety, and at least one network that is critical in regard to operation and/or safety is accessible, comprising:
   a nonvolatile, readable memory that stores processor-readable control program commands of a program module controlling the access control, and
   a processor, connected to the memory, that executes the control program commands of the program module for access control such that:
   a) each network access, prompts at least one network communication protocol used in the respective network for network communication to be ascertained,
   b) the respective ascertained network communication protocol is collated with a multiplicity of reference protocols that are usually used in the operation- and/or safety-critical networks, c) if the collation of the ascertained network communication protocol with the reference protocols reveals that at least one ascertained network communication protocol is concordant with a dedicated reference protocol of the reference protocols, the respective network access, then prompts at least one warning to be provided, if an inadvertent or intentional but inadmissible attempt is made to access the operation and/or safety-critical network, otherwise the access to network data is effected without the provision of the warning.

11. The computer program product as claimed in claim 10, wherein the warning is an audible warning signal.

12. The computer program product as claimed in claim 10, wherein the processor and the program module are configured such that the warning prompts the network-related access to be color coded, further wherein a "GREEN" color is for the network access to the uncritical network or standard network and a "RED" color is for the network access to the operation- and/or safety-critical network.

13. The computer program product as claimed in claim 10, wherein the processor and the program module are configured such that the provision of the warning prompts the network access to the operation- and/or safety-critical network to be blocked and/or disabled automatically.

14. The computer program product as claimed in claim 10, wherein the processor and the program module are configured such that the provision of the warning prompts the admissibility of the network communication protocols used for the network accesses to be restricted.

15. The computer program product as claimed in claim 10, wherein the processor and the program module are configured such that different warnings are provided for the network accesses for a setup of the network connectivities, to different networks critical in regard to operation and/or safety.

16. The computer program product as claimed in claim 10, wherein the product is implemented in a control unit that is configured as a service notebook, diagnosis device, startup device, maintenance device or configuration device, "Internet of Things <IoT>" device or device for capturing predictive maintenance data.

17. A control unit for controlling accesses to networks based on IT systems comprising embedded systems or distributed systems, having at least one network interface via which at least one from at least one network that is uncritical in regard to operation and/or safety, and at least one network that is critical in regard to operation and/or safety is or are accessible,
comprising:
a nonvolatile, readable memory that stores processor-readable control program commands of a program module controlling the access control, and
a processor, connected to the memory, that executes the control program commands of the program module, is connected to the network interface, to a protocol data memory and to an output interface and is configured for controlling the accesses to the networks with the network interface as a functional unit such that:
a) each network access prompts at least one network communication protocol used in the respective network for network communication to be ascertained,
b) the respective ascertained network communication protocol is collated with a multiplicity of reference protocols that are usually used in the operation- and/or safety-critical networks, c) if the collation of the ascertained network communication protocol with the reference protocols reveals that at least one ascertained network communication protocol is concordant with a dedicated reference protocol of the reference protocols, the respective network access, then prompts at least one warning to be generated, to be generated and output via the output interface, if an inadvertent or intentional but inadmissible attempt is made to access the operation- and/or safety-critical network, otherwise the access to network data is effected without the generation and output of the warning.

18. The control unit as claimed in claim 17, wherein the warning is an audible warning signal.

19. The control unit as claimed in claim 17, wherein the processor and the program module are configured such that the warning prompts the network-related access to be color coded, and displayed on the network interface is a "GREEN" color for the network access to the uncritical network or standard network and a "RED" color for the network access to the operation- and/or safety-critical network.

20. The control unit as claimed in claim 17, wherein the processor, the program module and the output interface are configured such that the warning prompts the network-related access to be displayed in an administration menu or prompts a network access status to be displayed.

21. The control unit as claimed in claim 17, wherein the processor, the program module and the output interface are configured such that the warning prompts an error message to be displayed.

22. The control unit as claimed in claim 17, wherein the processor, the program module and the network interface are configured such that the provision of the warning prompts the network access to the operation- and/or safety-critical network, and the network interface, to be blocked and/or disabled automatically.

23. The control unit as claimed in claim 17, wherein the processor, the program module and the network interface are configured such that the provision of the warning prompts the admissibility of the network communication protocols used for the network accesses, and on the network interface by the control unit, to be restricted.

24. The control unit as claimed in claim 22, wherein an input interface is included that is connected to the processor and, by virtue of this connection, forms, together with the program module executed by the processor and the network interface, a functional unit that is configured such that the blocking or disabling is canceled again by control commands or enabling codes input by a network administrator and the network access to the operation- and/or safety-critical network, and the network interface to the operation- and/or safety-critical network, is enabled again.

25. The control unit as claimed in claim 17, wherein the processor, the program module, the output interface and the network interface are configured such that different warnings are generated and output for the network accesses for a setup of the network connectivities, to different networks critical in regard to operation and/or safety.

26. The control unit as claimed in claim 17, further comprising a service notebook, a diagnosis device, startup device, maintenance device or configuration device, an "Internet of Things <IoT>" device or a device for capturing predictive maintenance data.

* * * * *